US008878476B2

(12) United States Patent  
Hirose

(10) Patent No.: US 8,878,476 B2  
(45) Date of Patent: Nov. 4, 2014

(54) METHOD FOR DISCHARGING CHARGES REMAINING IN CAPACITOR IN APPARATUS

(75) Inventor: Satoshi Hirose, Miyoshi (JP)

(73) Assignee: Toyota Jidosha Kabushiki Kaisha, Toyota-Shi (JP)

(*) Notice: Subject to any disclaimer, the term of this patent is extended or adjusted under 35 U.S.C. 154(b) by 47 days.

(21) Appl. No.: 13/549,127

(22) Filed: Jul. 13, 2012

(65) Prior Publication Data

US 2013/0015802 A1 Jan. 17, 2013

(30) Foreign Application Priority Data

Jul. 14, 2011 (JP) ................................. 2011-155505

(51) Int. Cl.
| | |
|---|---|
| H02P 6/14 | (2006.01) |
| B60L 3/04 | (2006.01) |
| B60L 3/00 | (2006.01) |
| H02M 7/48 | (2006.01) |
| B60L 15/00 | (2006.01) |
| H02M 1/32 | (2007.01) |

(52) U.S. Cl.
CPC .......... *H02M 1/32* (2013.01); *H02M 2001/322* (2013.01); *B60L 3/007* (2013.01); *B60L 3/04* (2013.01); *B60L 3/00* (2013.01); *H02M 7/48* (2013.01); *B60L 15/007* (2013.01)
USPC ................. 318/400.26; 318/139; 318/400.17; 307/9.1; 307/10.1; 363/50; 180/271

(58) Field of Classification Search
CPC .................................................. H02P 2201/00
USPC ..................... 307/9.1, 10.1; 363/50; 180/271; 318/400.17, 139, 400.26
See application file for complete search history.

(56) References Cited

U.S. PATENT DOCUMENTS

| 8,247,920 | B2 * | 8/2012 | Hirasawa ........................ 307/9.1 |
| 8,415,825 | B2 * | 4/2013 | Hirose ............................ 307/9.1 |
| 2007/0165432 | A1 * | 7/2007 | Okamura et al. .............. 363/132 |
| 2008/0265975 | A1 * | 10/2008 | Takasu et al. .................. 327/374 |
| 2010/0214055 | A1 * | 8/2010 | Fuji et al. ....................... 340/3.1 |
| 2012/0039100 | A1 | 2/2012 | Hirose |
| 2013/0234510 | A1 * | 9/2013 | Nakamura .................... 307/10.1 |

FOREIGN PATENT DOCUMENTS

| JP | 2002-323573 A | 11/2002 |
| JP | 2003-348856 A | 12/2003 |
| JP | 2004-201439 A | 7/2004 |
| JP | 2008-061300 A | 3/2008 |
| WO | 20100131353 A1 | 11/2010 |

* cited by examiner

*Primary Examiner* — Eduardo Colon Santana  
*Assistant Examiner* — Bickey Dhakal  
(74) *Attorney, Agent, or Firm* — Kenyon & Kenyon LLP

(57) ABSTRACT

A PCU drives a motor generator using electric power from a power storage device. The PCU includes a power conversion device, a capacitor and a control unit. When detecting a crash, the control unit drives the power conversion device and discharges charges remaining in the capacitor. Each of a plurality of reverse conducting-type semiconductor elements included in the power conversion device is integrally formed of a first semiconductor element operating as a switching element and a second semiconductor element operating as a free wheeling diode. In response to detection of the crash of a vehicle, the control unit changes a voltage applied to a gate terminal of the first semiconductor element and increases an electric power loss during a current-circulating operation by the second semiconductor element. As a result, the remaining charges stored in the capacitor in the drive apparatus is discharged as soon as possible.

12 Claims, 10 Drawing Sheets

METHOD FOR DISCHARGING CHARGES REMAINING IN CAPACITOR IN APPARATUS

This nonprovisional application is based on Japanese Patent Application No. 2011-155505 filed on Jul. 14, 2011 with the Japan Patent Office, the entire contents of which are hereby incorporated by reference.

BACKGROUND OF THE INVENTION

1. Field of the Invention

The present invention relates to a drive apparatus, a vehicle having the drive apparatus mounted thereon, and a method for controlling the drive apparatus. More particularly, the present invention relates to a technique of discharging charges remaining in a capacitor in the drive apparatus.

2. Description of the Background Art

As an environmentally-friendly vehicle, attention has been recently focused on an electric powered vehicle that has a power storage device (such as, for example, a secondary battery or a capacitor) mounted thereon and runs using drive force generated from electric power stored in the power storage device. This electric powered vehicle includes, for example, an electric vehicle, a hybrid vehicle, a fuel cell vehicle and the like.

This electric powered vehicle may include a motor generator for receiving electric power from the power storage device and generating drive force for running at the time of startup or acceleration, and generating electric power by regenerative braking and storing electrical energy in the power storage device at the time of braking. In order to control the motor generator depending on the running state as described above, a power conversion device converting electric power with a converter and an inverter is mounted on the electric powered vehicle.

This power conversion device includes a large-capacitance smoothing capacitor to stabilize supplied DC electric power. During operation of the power conversion device, charges corresponding to an applied voltage are stored in the smoothing capacitor.

These charges stored in the smoothing capacitor must be discharged quickly when a vehicle crash occurs, for example.

Japanese Patent Laying-Open No. 2004-201439 discloses such a configuration that in a hybrid vehicle or an electric vehicle, charges remaining in a capacitor included in a voltage conversion system are charged back to a DC power supply when driving of a motor stops, and the charges remaining in the capacitor are discharged with a converter by repeating a boosting operation and a step-down operation of the converter included in the voltage conversion system when a voltage across the capacitor becomes equal to or lower than a voltage of the DC power supply and chargeback becomes impossible.

SUMMARY OF THE INVENTION

According to the technique disclosed in Japanese Patent Laying-Open No. 2004-201439, when a vehicle crash occurs and driving of the motor stops, the charges stored in the capacitor are charged back, and thereafter, the remaining charges are consumed by the converter. Therefore, the influence of high-voltage electric power stored in the capacitor on the surroundings when a crash occurs can be eliminated.

Depending on the state of the crash, however, power supply to a control device may be reduced or interrupted with the passage of time. Then, in some cases, an instruction for driving the converter cannot be outputted and the charges remaining in the capacitor cannot be discharged appropriately. Therefore, when a crash occurs, for example, the charges remaining in the capacitor must be discharged as soon as possible.

The present invention has been made to solve the above problems and an object thereof is to discharge the remaining charges stored in the capacitor in a drive apparatus as soon as possible in the vehicle capable of running using electric power from the power storage device.

A drive apparatus according to the present invention is a drive apparatus for driving a rotating electric machine mounted on a vehicle by using electric power from a power storage device. The drive apparatus includes: a power conversion device including a switching element and converting the electric power from the power storage device; a capacitor connected in parallel to the power conversion device; and a control device for driving a control terminal of the switching element and discharging a charge stored in the capacitor. The power conversion device includes a plurality of reverse conducting-type semiconductor elements. Each of the plurality of reverse conducting-type semiconductor elements is integrally formed of a first semiconductor element operating as the switching element and a second semiconductor element connected in parallel to the first semiconductor element and operating as a free wheeling diode. At the time of an operation for discharging the capacitor, the control device changes a voltage applied to the control terminal of the first semiconductor element and increases an electric power loss in the second semiconductor element during a current-circulating operation by the second semiconductor element.

Preferably, each of the plurality of reverse conducting-type semiconductor elements has a property that a conduction resistance of the second semiconductor element increases as the voltage applied to the control terminal of the first semiconductor element increases during the current-circulating operation. At the time of discharging the capacitor, the control device sets the voltage applied to the control terminal of the first semiconductor element included in the reverse conducting-type semiconductor element existing in a circulating path during the current-circulating operation, among the plurality of reverse conducting-type semiconductor elements, to be higher than a voltage applied when the rotating electric machine is driven.

Preferably, the power conversion device is an inverter including at least one of the plurality of reverse conducting-type semiconductor elements and driving the rotating electric machine. At the time of discharging the capacitor, the control device discharges the charge in the capacitor by using the inverter and the rotating electric machine.

Preferably, the control device discharges the charge in the capacitor by causing a coil included in the rotating electric machine to consume the charge, without rotating the rotating electric machine.

Preferably, the power conversion device is a converter including at least one of the plurality of reverse conducting-type semiconductor elements and a reactor, which constitute a chopper circuit, and converting a DC voltage supplied from the power storage device. At the time of discharging the capacitor, the control device controls the converter to discharge the charge in the capacitor using the reactor.

Preferably, in each of the plurality of reverse conducting-type semiconductor elements, the first semiconductor element is formed of an IGBT and the second semiconductor element is formed of a diode connected in antiparallel to the IGBT.

Preferably, each of the plurality of reverse conducting-type semiconductor elements is formed of a power MOSFET, and the second semiconductor element is a parasitic diode of the power MOSFET.

Preferably, the vehicle includes a crash detecting unit for detecting a crash of the vehicle. When the crash detecting unit detects the crash of the vehicle, the control device drives the control terminal of the switching element and discharges the charge stored in the capacitor.

According to another aspect of the present invention, a drive apparatus according to the present invention is a drive apparatus for driving a rotating electric machine mounted on a vehicle by using electric power from a power storage device, the drive apparatus including: an inverter for driving the rotating electric machine; a capacitor connected in parallel to the inverter; and a control device for driving a control terminal of the switching element and discharging a charge stored in the capacitor. The inverter has at least one reverse conducting-type semiconductor element integrally formed of a first semiconductor element operating as a switching element and a second semiconductor element connected in parallel to the first semiconductor element and operating as a free wheeling diode. At the time of an operation for discharging the capacitor, the control device changes a voltage applied to the control terminal of the first semiconductor element and increases an electric power loss in the second semiconductor element during a current-circulating operation by the second semiconductor element.

Preferably, the drive apparatus further includes a converter having the reverse conducting-type semiconductor element, and converting a DC voltage from the power storage device and supplying the converted DC voltage to the inverter.

According to still another aspect of the present invention, the present invention is directed to a vehicle, including: a power storage device; a rotating electric machine; and a drive apparatus for driving the rotating electric machine by using electric power from the power storage device, and generating running drive force. The drive apparatus includes: a power conversion device having a switching element and converting the electric power from the power storage device; a capacitor connected in parallel to the power conversion device; and a control device for driving a control terminal of the switching element and discharging a charge stored in the capacitor. The power conversion device includes a plurality of reverse conducting-type semiconductor elements. Each of the plurality of reverse conducting-type semiconductor elements is integrally formed of a first semiconductor element operating as the switching element and a second semiconductor element connected in parallel to the first semiconductor element and operating as a free wheeling diode. At the time of an operation for discharging the capacitor, the control device changes a voltage applied to the control terminal of the first semiconductor element and increases an electric power loss in the second semiconductor element during a current-circulating operation by the second semiconductor element.

According to a further aspect of the present invention, the present invention is directed to a method for controlling a drive apparatus for driving a rotating electric machine mounted on a vehicle by using electric power from a power storage device, the drive apparatus including: a power conversion device having a switching element and converting the electric power from the power storage device; and a capacitor connected in parallel to the power conversion device. The power conversion device includes a plurality of reverse conducting-type semiconductor elements. Each of the plurality of reverse conducting-type semiconductor elements is integrally formed of a first semiconductor element operating as the switching element and a second semiconductor element connected in parallel to the first semiconductor element and operating as a free wheeling diode. The method includes the steps of: driving a control terminal of the switching element and discharging a charge stored in the capacitor; and at the time of discharging the charge in the capacitor, changing a voltage applied to the control terminal of the first semiconductor element and increasing an electric power loss in the second semiconductor element during a current-circulating operation by the second semiconductor element.

The main effect of the present invention is to discharge the remaining charges stored in the capacitor in the drive apparatus as soon as possible in the vehicle capable of running using the electric power from the power storage device.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
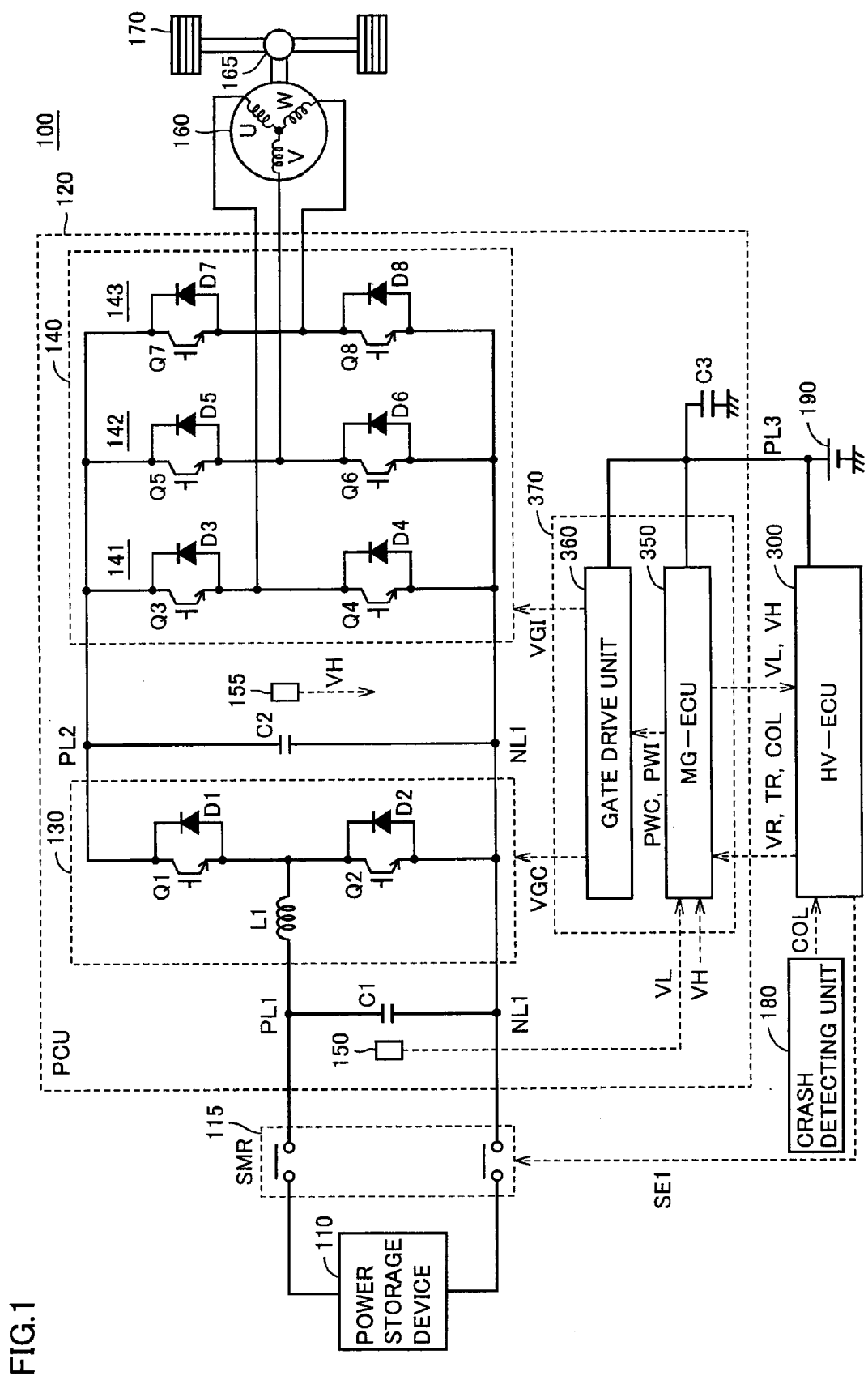
FIG. 1 is an overall block diagram of a vehicle on which a drive apparatus according to an embodiment of the present invention is mounted.

An embodiment of the present invention will be described in detail hereinafter with reference to the drawings, in which the same or corresponding portions are denoted with the same reference characters and a description thereof will not be repeated.

FIG. 1 is an overall block diagram of a vehicle 100 on which a drive apparatus according to the embodiment of the present invention is mounted. Although vehicle 100 is described as an electric vehicle by way of example in the present embodiment, the configuration of vehicle 100 is not limited thereto. The present invention is applicable as long as vehicle 100 is a vehicle capable of running using electric power from a power storage device. Vehicle 100 includes, for example, a hybrid vehicle, a fuel cell vehicle and the like, in addition to the electric vehicle.

Referring to FIG. 1, vehicle 100 includes a power storage device 110, a system main relay (SMR) 115, a PCU (Power Control Unit) 120 serving as a drive apparatus, a motor generator 160, a motive power transmission gear 165, a drive wheel 170, a crash detecting unit 180, an auxiliary battery 190, and an HV-ECU (Electronic Control Unit) 300.

PCU 120 includes a converter 130, an inverter 140, an MG-ECU 350, a gate drive unit 360, and capacitors C1 to C3. MG-ECU 350 and gate drive unit 360 constitute a control unit 370 in PCU 120. Each device in PCU 120 is generally housed in the same housing and is coupled to other devices external to PCU 120 by a cable, a bus bar or the like.

Power storage device 110 is an electric power storage element configured to be rechargeable. Power storage device 110 is configured to include, for example, a secondary battery such as a lithium-ion battery, a nickel-metal hydride battery or a lead storage battery, or a power storage element such as an electric double layer capacitor.

Power storage device 110 is connected to converter 130 in PCU 120 by electric power lines PL1 and NL1. Power storage device 110 supplies electric power for driving motor generator 160 to PCU 120. Power storage device 110 also stores electric power generated by motor generator 160. An output of power storage device 110 is approximately 200 V, for example.

A relay included in SMR 115 is connected to power storage device 110 and electric power line PL1 or NL1. SMR 115 is controlled in accordance with a control signal SE1 from HV-ECU 300 and switches supply and interruption of electric power between power storage device 110 and converter 130.

Capacitor C1 is connected between electric power line PL1 and electric power line NL1. Capacitor C1 reduces voltage fluctuations between electric power line PL1 and electric power line NL1. A voltage sensor 150 detects a voltage applied to capacitor C1 and outputs a detection value VL to MG-ECU 350.

Converter 130 includes switching elements Q1 and Q2, diodes D1 and D2, and a reactor L1.

Switching elements Q1 and Q2 are serially connected between electric power lines PL2 and NL1, taking a direction from electric power line PL2 toward electric power line NL1 as a forward direction. Although the switching element is described as an IGBT by way of example in the present embodiment, a power MOS (Metal Oxide Semiconductor) transistor, a power bipolar transistor or the like can also be used as other examples.

Antiparallel diodes D1 and D2 are connected to switching elements Q1 and Q2, respectively. Reactor L1 is provided between electric power line PL1 and a node connecting switching elements Q1 and Q2. In other words, converter 130 constitutes a chopper circuit.

Switching elements Q1 and Q2 are controlled in accordance with a gate voltage signal VGC generated by gate drive unit 360 based on a control signal PWC from MG-ECU 350, and perform a voltage conversion operation between electric power lines PL1, NL1 and electric power lines PL2, NL1.

Converter 130 is basically controlled such that switching elements Q1 and Q2 are turned on/off alternately and in a complementary manner within each switching cycle. During the boosting operation, converter 130 boosts a DC voltage from power storage device 110. This boosting operation is performed by supplying electromagnetic energy stored in reactor L1 during the ON period of switching element Q2 to electric power line PL2 via switching element Q1 and antiparallel diode D1.

During the step-down operation, converter 130 steps down a DC voltage from inverter 140. This step-down operation is performed by supplying electromagnetic energy stored in reactor L1 during the ON period of switching element Q1 to electric power line NL1 via switching element Q2 and antiparallel diode D2.

A voltage conversion ratio in these boosting and step-down operations is controlled in accordance with a ratio between the ON period of switching element Q1 and the ON period of switching element Q2 (duty ratio) in the aforementioned switching cycle. It is to be noted that when the boosting and step-down operations are unnecessary, the voltage conversion ratio can also be set to 1.0 (duty ratio=100%) by setting control signal PWC so as to fix switching element Q1 to ON and switching element Q2 to OFF.

It is to be noted that converter 130 is not essential in the present invention and the present invention may have such a configuration that an output voltage from power storage device 110 is directly supplied to inverter 140.

Capacitor C2 is connected between electric power lines PL2 and NL1 connecting converter 130 and inverter 140. Capacitor C2 reduces voltage fluctuations between electric power line PL2 and electric power line NL1. A voltage sensor 155 detects a voltage applied to capacitor C2 and outputs a detection value VH to MG-ECU 350.

Inverter 140 is connected to converter 130 by electric power lines PL2 and NL1. Inverter 140 is controlled in accordance with a gate voltage signal VGI generated by gate drive unit 360 based on a control signal PWI from MG-ECU 350, and converts DC electric power outputted from converter 130 to AC electric power for driving motor generator 160.

Inverter 140 includes a U-phase arm 141, a V-phase arm 142 and a W-phase arm 143, which constitute a bridge circuit. U-phase arm 141, V-phase arm 142 and W-phase arm 143 are connected in parallel between electric power line PL2 and electric power line NL1.

U-phase arm 141 includes switching elements Q3 and Q4 serially connected between electric power line PL2 and electric power line NL1, and diodes D3 and D4 connected in parallel to switching elements Q3 and Q4, respectively. Diode D3 has a cathode connected to a collector of switching element Q3 and an anode connected to an emitter of switching element Q3. Diode D4 has a cathode connected to a collector of switching element Q4 and an anode connected to an emitter of switching element Q4.

V-phase arm 142 includes switching elements Q5 and Q6 serially connected between electric power line PL2 and electric power line NL1, and diodes D5 and D6 connected in parallel to switching elements Q5 and Q6, respectively. Diode D5 has a cathode connected to a collector of switching element Q5 and an anode connected to an emitter of switching element Q5. Diode D6 has a cathode connected to a collector of switching element Q6 and an anode connected to an emitter of switching element Q6.

W-phase arm 143 includes switching elements Q7 and Q8 serially connected between electric power line PL2 and electric power line NL1, and diodes D7 and D8 connected in parallel to switching elements Q7 and Q8, respectively. Diode D7 has a cathode connected to a collector of switching element Q7 and an anode connected to an emitter of switching element Q7. Diode D8 has a cathode connected to a collector of switching element Q8 and an anode connected to an emitter of switching element Q8.

Motor generator 160 is, for example, a three-phase AC motor generator including a rotor having a permanent magnet embedded therein and a stator having three-phase coils that are "Y"-connected at a neutral point. One end of each of the U-phase, V-phase and W-phase coils is connected to the neutral point. The other end of the U-phase coil is connected to a node connecting switching elements Q3 and Q4. The other end of the V-phase coil is connected to a node connecting switching elements Q5 and Q6. The other end of the W-phase coil is connected to a node connecting switching elements Q7 and Q8.

Output torque of motor generator 160 is transmitted to drive wheel 170 via motive power transmission gear 165 formed of a decelerator and a power split device, and causes vehicle 100 to run. During the regenerative braking operation of vehicle 100, motor generator 160 can generate electric power using rotational force of drive wheel 170. The generated electric power is converted by inverter 140 to electric power for charging power storage device 110.

In a hybrid vehicle on which an engine (not shown) is mounted in addition to motor generator 160, this engine and motor generator 160 are operated in a cooperative manner to generate necessary vehicle drive force. In this case, power storage device 110 can also be charged using electric power generated as a result of rotation of the engine.

Although FIG. 1 shows such a configuration that one motor generator is provided, the number of the motor generator is not limited thereto. A plurality of motor generators may be provided. For example, in the case of a hybrid vehicle including two motor generators, one may be used entirely as a motor for driving drive wheel 170 and the other may be used entirely as a generator driven by the engine.

Crash detecting unit 180 includes a not-shown sensor (e.g., a G sensor) and detects whether or not vehicle 100 has crashed. Then, crash detecting unit 180 outputs a crash detection signal COL to HV-ECU 300.

HV-ECU 300 and MG-ECU 350 include a CPU (Central Processing Unit), a storage device and an input/output buffer, although they are not shown in FIG. 1. HV-ECU 300 and MG-ECU 350 receive a signal from each sensor and the like or output a control signal to each device, and control vehicle 100 and each device. HV-ECU 300 is a control device for centralized control over the entire vehicle, and MG-ECU 350 is a control device for controlling the devices (converter 130, inverter 140, gate drive unit 360 and the like) in PCU 120. Control in HV-ECU 300 and MG-ECU 350 is not limited to processing by software and the control can also be implemented by dedicated hardware (electronic circuit).

Although such a configuration that HV-ECU 300 and MG-ECU 350 are individually provided as the control device is shown in FIG. 1 by way of example, the configuration of the control device is not limited thereto. For example, HV-ECU 300 and MG-ECU 350 may be integrated into one control device, or a larger number of control devices may be provided for each device and each function.

HV-ECU 300 receives crash detection signal COL from crash detecting unit 180. HV-ECU 300 also receives voltages VL and VH detected by voltage sensors 150 and 155 from MG-ECU 350. HV-ECU 300 calculates a target boost voltage VR and a target request torque TR of converter 130 based on user's operation of an accelerator, the rotation speed of motor generator 160 and the like. Then, HV-ECU 300 outputs target boost voltage VR, target request torque TR and crash detection signal COL to MG-ECU 350.

MG-ECU 350 generates control signals PWC and PWI for driving converter 130 and inverter 140, respectively, based on target boost voltage VR and target request torque TR from HV-ECU 300, detection values VL and VH by voltage sensors 150 and 155, the current and the rotation speed of motor generator 160, and the like. MG-ECU 350 outputs these control signals PWC and PWI to gate drive unit 360.

Gate drive unit 360 generates gate voltage signals VGC and VGI for driving a gate of each switching element included in converter 130 and inverter 140, respectively, based on control signals PWC and PWI, and outputs gate voltage signals VGC and VGI to converter 130 and inverter 140, respectively.

MG-ECU 350 also receives crash detection signal COL of vehicle 100 from HV-ECU 300. Upon receiving crash detection signal COL, MG-ECU 350 generates control signals PWC and PWI so as to discharge remaining charges stored in capacitor C2 by using motor generator 160 and/or converter 130.

Auxiliary battery 190 is a voltage source for supplying a power supply voltage to the control devices such as each ECU and the low-voltage devices of vehicle 100 such as a not-shown auxiliary device. Auxiliary battery 190 is typically formed of a lead storage battery and an output voltage thereof is approximately 12 V, for example.

Auxiliary battery 190 is connected to HV-ECU 300, MG-ECU 350 and gate drive unit 360 by an electric power line PL3 and supplies the power supply voltage to these devices.

Capacitor C3 is provided between electric power line PL3 and a ground in PCU 120. Capacitor C3 is a backup capacitor for operating MG-ECU 350 and gate drive unit 360 for a while when supply of the power supply voltage from auxiliary battery 190 to PCU 120 is interrupted, and stores electric power using the voltage from auxiliary battery 190. As a result, even when supply of the power supply voltage from auxiliary battery 190 to PCU 120 is interrupted due to a crash and the like, MG-ECU 350 and gate drive unit 360 can be operated for a while using the electric power stored in capacitor C3.

In vehicle 100 having the above-mentioned configuration, when vehicle 100 runs using the drive force from motor generator 160, capacitors C1 and C2 in PCU 120 have charges stored therein. When a crash occurs in this state, it is desirable to discharge the remaining charges stored in capacitors C1 and C2 as soon as possible in order to suppress breakage of the devices and an influence on the surroundings caused by a short circuit, a ground fault and the like.

Such discharging may be implemented by driving inverter 140 and passing a d-axis current through motor generator 160 to cause the coils in motor generator 160 to consume the charges without rotating motor generator 160, or by repeating the boosting operation and the step-down operation of converter 130 to cause reactor L1 included in converter 130 to consume the charges.

In this case, MG-ECU 350 and gate drive unit 360 must be operated to drive converter 130 and inverter 140. However, when supply of the power supply voltage from auxiliary battery 190 to PCU 120 is interrupted due to, for example, a crash, there is a possibility that the discharging operation cannot be completed only with the electric power stored in capacitor C3. Increasing the capacitance of capacitor C3 in order to address this leads to an increase in cost.

Therefore, the discharging operation must be completed reliably without increasing the capacitance of capacitor C3, even when supply of the power supply voltage from auxiliary battery 190 to PCU 120 is interrupted at the time of occurrence of a crash.

In converter 130 and inverter 140 in PCU 120, a so-called reverse conducting-type semiconductor element integrally formed of a switching element and a free wheeling diode (FWD) connected in antiparallel to the switching element may be used.

This reverse conducting-type semiconductor element has a property that the conduction resistance of the free wheeling diode increases when a gate voltage of the corresponding switching element is increased while a current is flowing through the free wheeling diode, as described below.

Thus, in the present embodiment, in the case where a power conversion device such as converter 130 and inverter 140 includes such reverse conducting-type semiconductor element, the above-mentioned property is used to shorten the discharge time.

Figure 2:
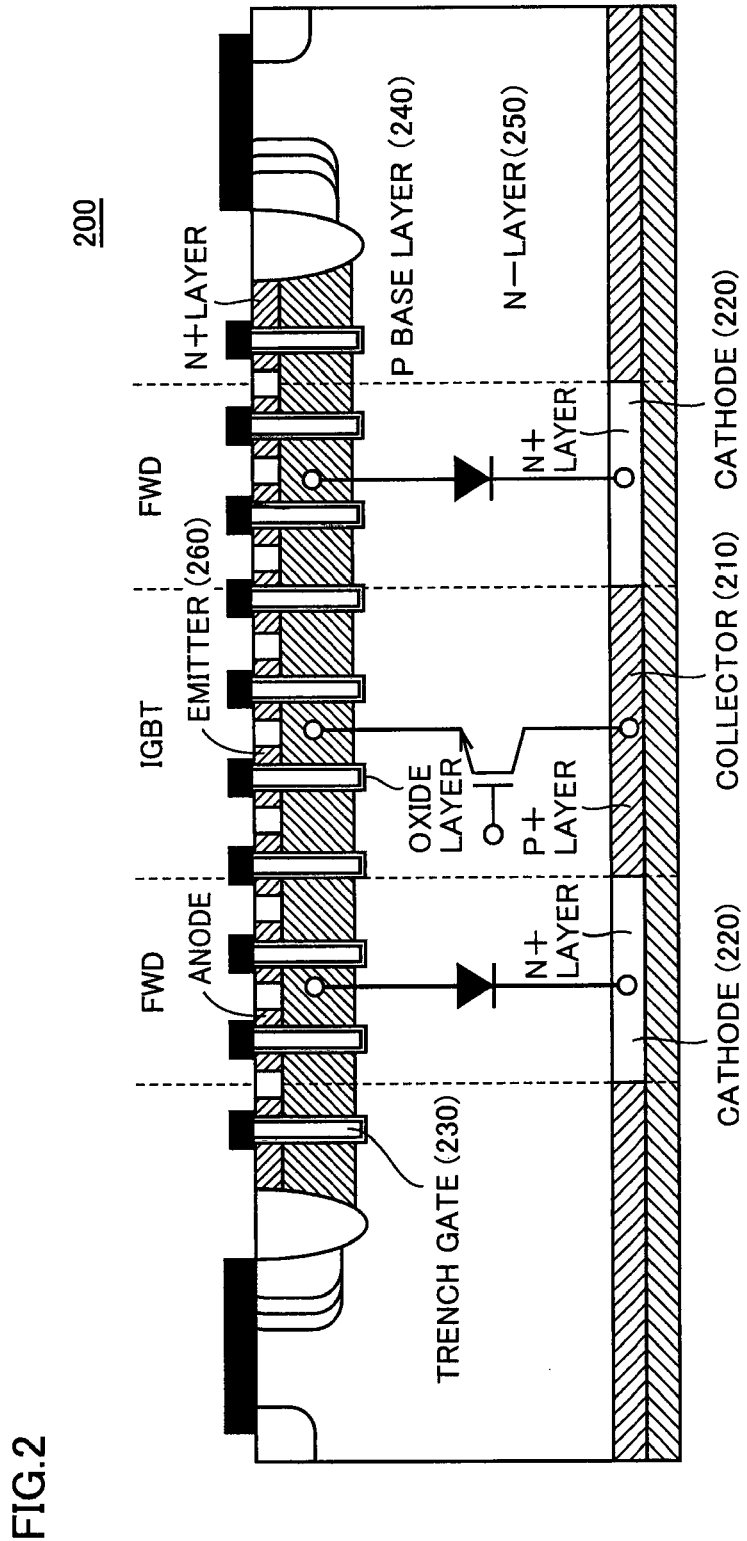
FIG. 2 is a diagram for describing one example of a reverse conducting-type semiconductor element formed of an IGBT and a diode.

FIG. 2 is a schematic view of an example of a cross-sectional structure of a reverse conducting-type semiconductor element 200. The reverse conducting-type semiconductor element in FIG. 2 is formed of an IGBT and a diode, and is also referred to as an RC-IGBT (Reverse Conducting-IGBT).

Referring to FIG. 2, a surface of reverse conducting-type semiconductor element 200 has a so-called trench gate-type structure. On the other hand, a back surface is formed of a collector layer (P+ layer) 210 that will form an IGBT region and a cathode layer (N+ layer) 220 that will form an FWD region. With such a configuration, when the potential on the collector 210 side is higher than the potential on the emitter 260 side, a current flows from collector 210 through a P base layer 240 to emitter 260 by applying the gate voltage to a trench gate 230 in the IGBT region. When the potential on the emitter 260 side is higher than the potential on the collector 210 side, a current flows from an anode to cathode 220 in the FWD region. Although the trench gate-type IGBT is shown in FIG. 2 by way of example, a planar gate-type IGBT may be used.

Figure 3:
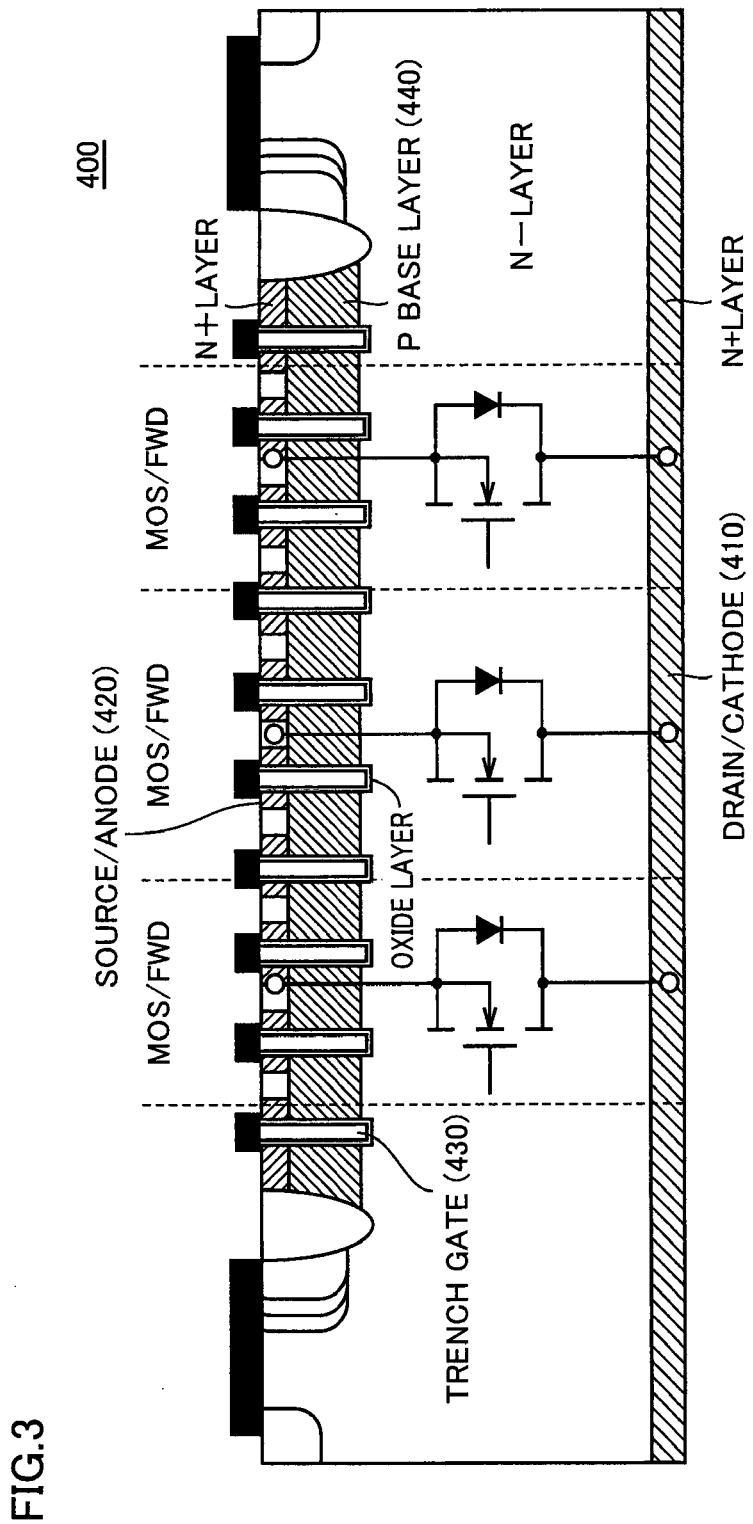
FIG. 3 is a diagram for describing one example of a reverse conducting-type semiconductor element formed of a power MOSFET.

FIG. 3 shows an example of a cross-sectional structure of a reverse conducting-type semiconductor element 400 formed of a power MOSFET. The power MOSFET includes a parasitic diode, and thus, when the potential of an anode 420 is higher than the potential of a cathode 410, this parasitic diode causes a current to flow from anode 420 to cathode 410. On the other hand, when the potential of drain 410 is higher than the potential of source 420, a current flows from drain 410 to source 420 by applying the gate voltage to a trench gate 430.

In such reverse conducting-type semiconductor element, it is known that the forward property of the diode decreases and the conduction resistance increases when the gate voltage is raised while the reverse conducting-type semiconductor element is operating as the diode. This is because raising the gate voltage causes expansion of a channel region in the P base layer and a potential difference between P base layer 240 and N− layer 250 in FIG. 2 decreases.

Figure 4:
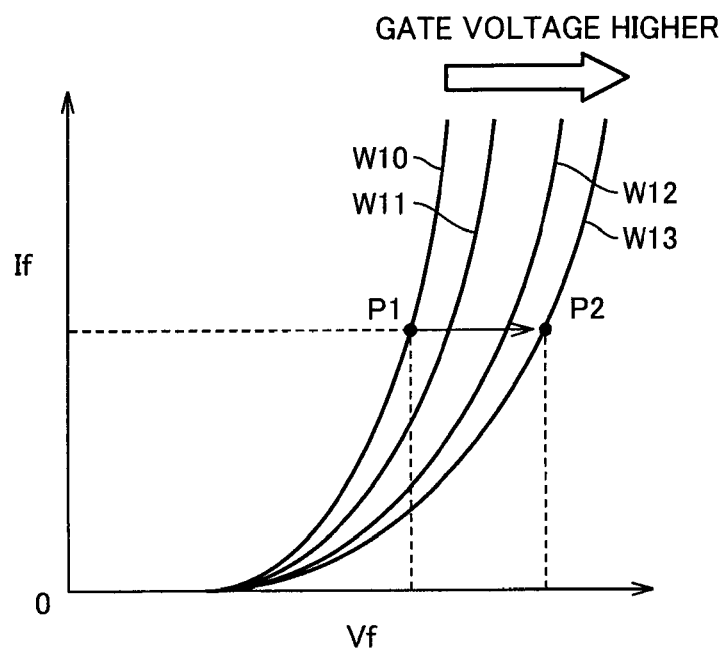
FIG. 4 is a graph for describing a relationship between voltage and current in a free wheeling diode when a gate voltage is changed.

FIG. 4 is a graph showing one example of the forward property of the diode that is the reverse conducting-type semiconductor element when the gate voltage is changed. In FIG. 4, a horizontal axis indicates a forward voltage Vf of the diode that is the reverse conducting-type semiconductor element, and a vertical axis indicates a current If flowing through the reverse conducting-type semiconductor element.

Referring to FIG. 4, as the gate voltage is raised, a curve of the forward property changes from a line W10 to a line W13. Therefore, when the gate voltage is raised while passing a current of the same magnitude, an operating point changes from a point P1 to a point P2 in FIG. 4, for example, and a voltage drop in the reverse conducting-type semiconductor element becomes greater. In other words, a conduction loss in the reverse conducting-type semiconductor element increases.

In the present embodiment, in the case where the power conversion device such as the inverter and the converter including the reverse conducting-type semiconductor element is used in the PCU, the above-mentioned property of the reverse conducting-type semiconductor element is used to discharge the charges remaining in the capacitor in the PCU in a short time. An operation for discharging the charges remaining in the capacitor will be described with reference to FIGS. 5 to 7.

Figure 5:
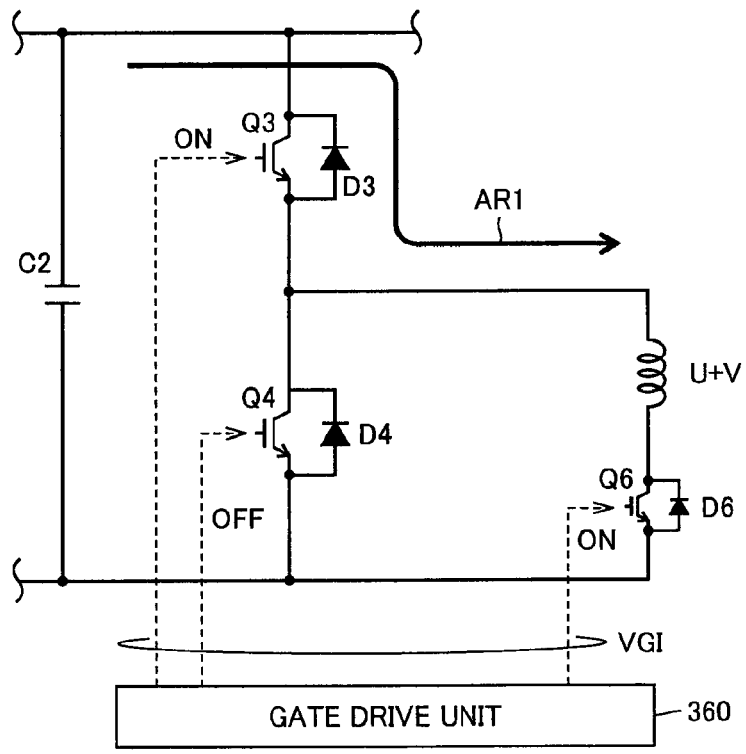
FIG. 5 is a first diagram for describing a current flow when an inverter is used to discharge charges remaining in a capacitor.

Referring to FIG. 5, based on gate voltage signal VGI from gate drive unit 360, for example, switching element Q3 in an upper arm of U-phase arm 141 and switching element Q6 in a lower arm of V-phase arm 142 in inverter 140 are brought into conduction. As a result, a current flows from capacitor C2 as indicated by an arrow AR1 in FIG. 5, and energy is stored in the U-phase and V-phase coils of motor generator 160.

Figure 6:
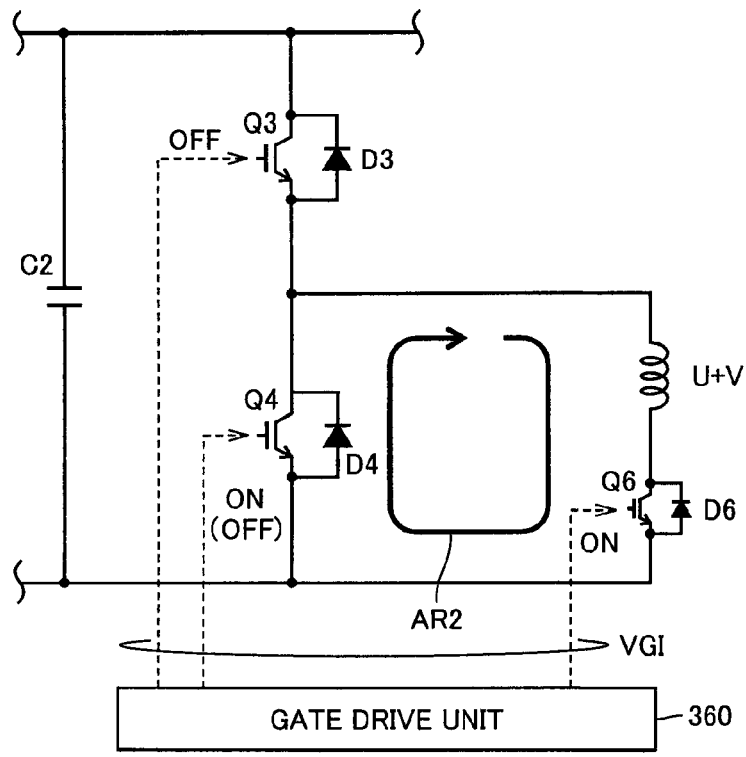
FIG. 6 is a second diagram for describing a current flow when the inverter is used to discharge the charges remaining in the capacitor.

Thereafter, in the state shown in FIG. 5, switching element Q3 in the upper arm of U-phase arm 141 is brought out of conduction as shown in FIG. 6. Then, due to the energy stored in the U-phase and V-phase coils, the current circulates through switching element Q6 and diode D4 as indicated by an arrow AR2 in FIG. 6. At this time, a conduction loss when the current flows through the U-phase and V-phase coils and each element causes discharging. Thereafter, when switching element Q3 is brought into conduction again, the current flows from capacitor C2 to the U-phase and V-phase coils again.

Figure 7:
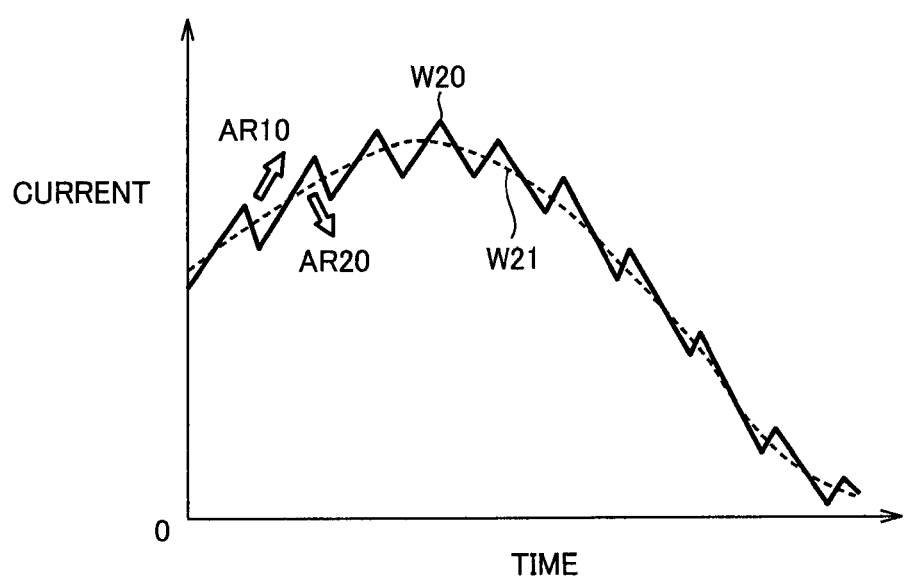
FIG. 7 is a graph showing one example of a relationship between switching operation of a switching element and load current.

As described above, by switching switching element Q3 between the conduction state and the non-conduction state at appropriate duty, the charges remaining in capacitor C2 are gradually discharged with time as shown in FIG. 7. It is to be noted that a line W20 in FIG. 7 indicates a current flowing through a load such as the above-mentioned U-phase and V-phase coils, an arrow AR10 indicates a current in the state shown in FIG. 5, and an arrow AR20 indicates a current in the state shown in FIG. 6. In addition, a dashed line W21 indicates an average load current.

In the above-mentioned discharging operation, diode D4 operating as the free wheeling diode is brought into conduction regardless of whether the gate voltage is applied to switching element Q4 or not. However, when switching element Q4 and diode D4 are formed of the above-mentioned reverse conducting-type semiconductor element, a conduction loss in diode D4 can be increased by raising the gate voltage. As a result, electric power consumption in the current-circulating operation increases and the discharge time can be shortened.

The case where the switching element in U-phase arm 141 is switched to discharge the remaining charges by using the U-phase and V-phase coils has been described with reference to FIGS. 5 and 6. However, in addition to switching element Q6, switching element Q8 in W-phase arm 143 may be brought into conduction to perform the discharging operation by further using the W-phase coil. In addition, instead of or in addition to U-phase arm 141, the switching elements in V-phase arm 142 and W-phase arm 143 may be switched to perform the discharging operation.

Figure 8:
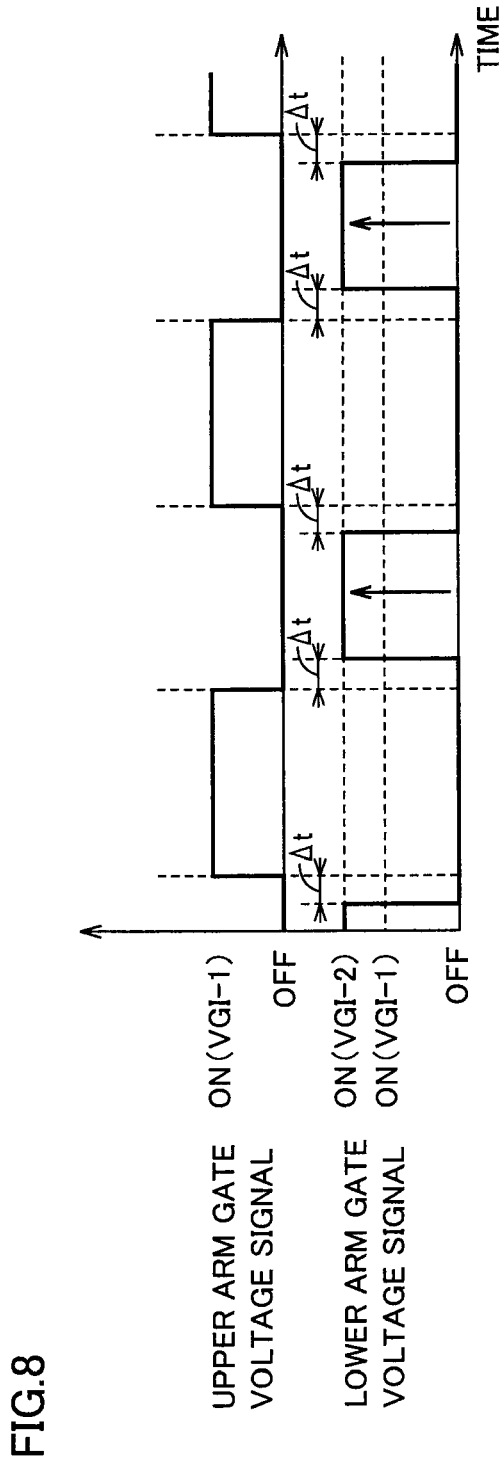
FIG. 8 is a diagram for describing a first example of timing to drive the switching element.

FIG. 8 is a time chart showing the gate voltage when the above-mentioned discharging operation is performed in the present embodiment. In FIG. 8, a horizontal axis indicates time and a vertical axis indicates gate voltage signals for switching elements Q3 and Q4.

Referring to FIG. 8, in PWM control, when the motor generator is driven to cause the vehicle to run, the gate voltage signal may be applied to the switching element in the upper arm to bring the switching element into conduction and a positive-side AC voltage is supplied to the coils of the motor generator. In this case, when the switching element in the upper arm is in the non-conduction state (the gate voltage signal is OFF), current-circulating takes place by the diode in the lower arm. At this time, the gate voltage signal is not generally applied to the switching element in the lower arm so as not to produce any unnecessary loss.

When a crash occurs, however, the gate voltage signal is applied to the switching element in the lower arm while the switching element in the upper arm is in the non-conduction state, in order to increase the conduction loss in the diode in the lower arm. As described with reference to FIG. 3, as the gate voltage increases, the conduction loss in the diode increases. Therefore, the applied gate voltage is more preferably set to a voltage VGI-2 higher than a gate voltage VGI-1 used in ordinary driving for causing the vehicle to run. Ideally, the applied gate voltage is desirably set to a maximum rated voltage that can be applied to the gate. It is to be noted that a dead time Δt is generally provided between the gate voltage applied to the switching element in the upper arm and the gate voltage applied to the switching element in the lower arm in order to prevent a short circuit caused by bringing the switching element in the upper arm and the switching element in the lower arm into conduction simultaneously.

Figure 9:
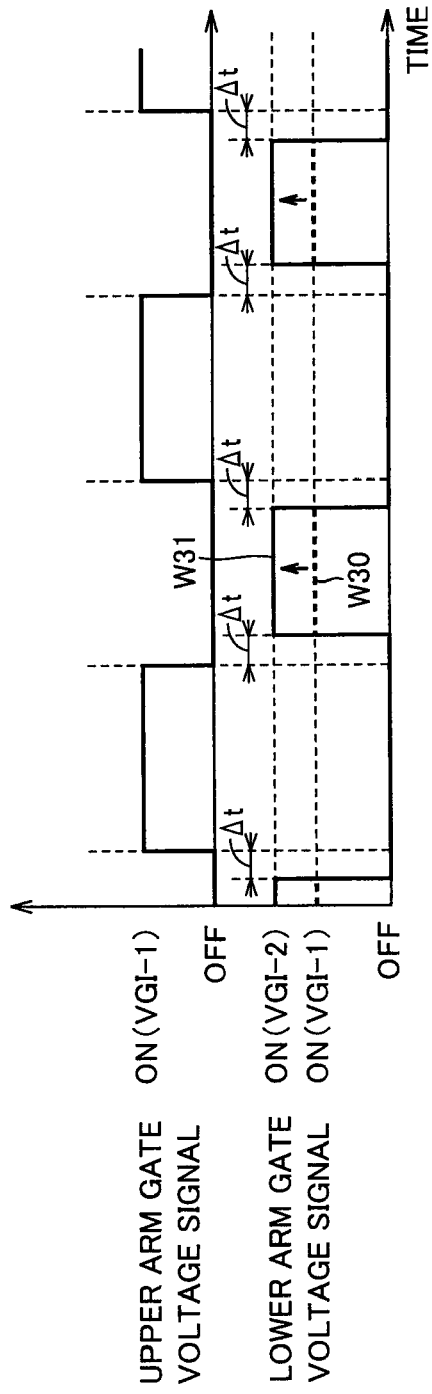
FIG. 9 is a diagram for describing a second example of timing to drive the switching element.

In addition, as shown in FIG. 9, in the case of ordinary driving for causing the vehicle to run as well, control may be performed such that the gate voltage is applied to the switching element in the upper arm and the switching element in the lower arm alternately and in a complementary manner (a dashed line W30 in FIG. 9). In this case as well, when current-circulating takes place by the diode in the lower arm, the gate voltage higher than the gate voltage in ordinary driving is applied to the switching element in the lower arm as indicated by a solid line W31 in FIG. 9, and thereby the conduction loss in the diode in the lower arm can be increased.

Figure 10:
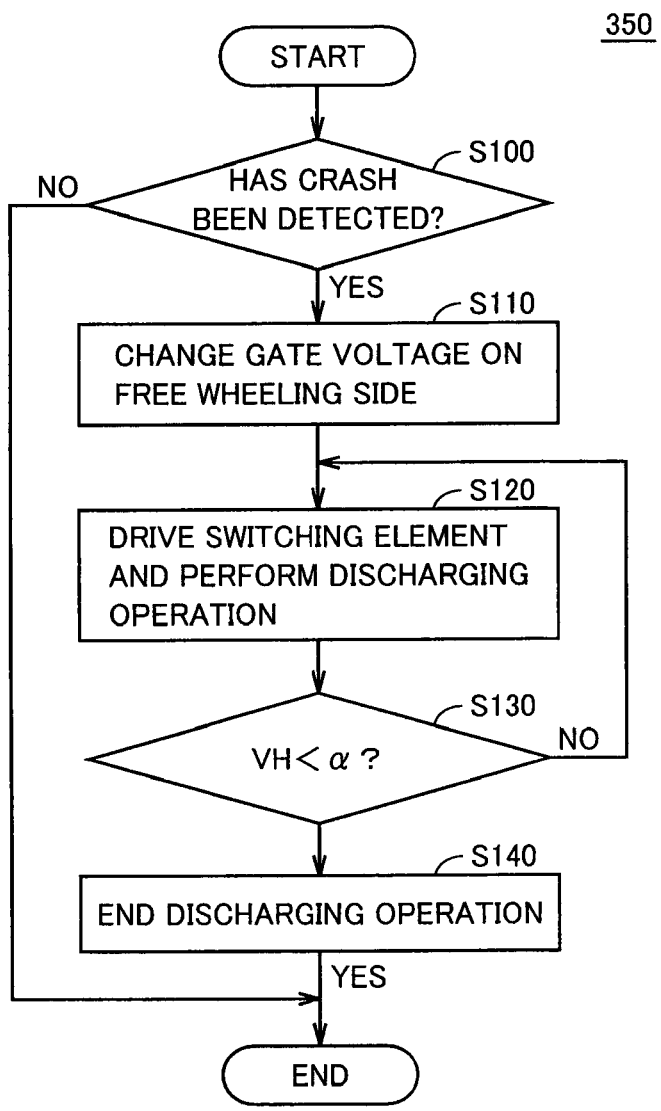
FIG. 10 is a flowchart for describing remaining charges discharging control process performed in an MG-ECU in the present embodiment.

FIG. 10 is a flowchart for describing remaining charges discharging control process performed in MG-ECU 350 when a vehicle crash occurs in the present embodiment. Each step in the flowchart shown in FIG. 10 is implemented by calling a program prestored in MG-ECU 350 from a main routine at a predetermined cycle and executing the program. Alternatively, a part of the steps can also be implemented by dedicated hardware (electronic circuit).

Referring to FIGS. 1 and 10, in step (hereinafter abbreviated as S) 100, MG-ECU 350 determines whether or not a crash of vehicle 100 has been detected, based on crash detection signal COL from HV-ECU 300. It is to be noted that in the case as well where communication between HV-ECU 300 and MG-ECU 350 is interrupted and MG-ECU 350 cannot receive crash detection signal COL due to a crash or other factors, MG-ECU 350 may determine that a crash has been detected because there is a possibility of a crash.

If a crash has not been detected (NO in S100), this process is unnecessary, and thus, MG-ECU 350 skips the subsequent process and ends the process.

If a crash has been detected (YES in S100), the process proceeds to S110 and MG-ECU 350 sets the gate voltage of the switching element on the free wheeling side to be higher than the gate voltage in the ordinary operation when the vehicle runs.

Then, in S120, MG-ECU 350 drives the switching element in inverter 140 and performs the operation for discharging the charges remaining in capacitor C2 as described above.

Thereafter, in S130, MG-ECU 350 determines whether or not voltage VH applied to capacitor C2 is smaller than a predetermined threshold value α. This threshold value α may be set to, for example, 60 V.

If voltage VH is larger than threshold value α (NO in S130), the discharging operation has not been completed yet. Therefore, the process returns to S120 and MG-ECU 350 continues the discharging operation until voltage VH becomes smaller than threshold value α.

If voltage VH is smaller than threshold value α (YES in S130), MG-ECU 350 determines that discharging the charges remaining in capacitor C2 has been completed and ends the discharging operation.

With the control in accordance with the above-mentioned process, the time for discharging the charges remaining in the capacitor included in the PCU can be shortened when a vehicle crash occurs. As a result, even when supply of the power supply voltage from the auxiliary battery to the PCU is interrupted, the discharging operation can be completed without using a large-capacitance backup capacitor. Therefore, an increase in cost can be prevented.

(Modification)

The configuration in which the inverter is driven and the remaining charges are discharged using the motor generator has been described in the above embodiment. In such a configuration that the DC voltage from the power storage device is boosted by the converter and supplied to the inverter as shown in FIG. 1, the converter may be operated to discharge the charges remaining in the capacitor, instead of or in addition to the above-mentioned discharging operation using the inverter and the motor generator.

Figure 11:
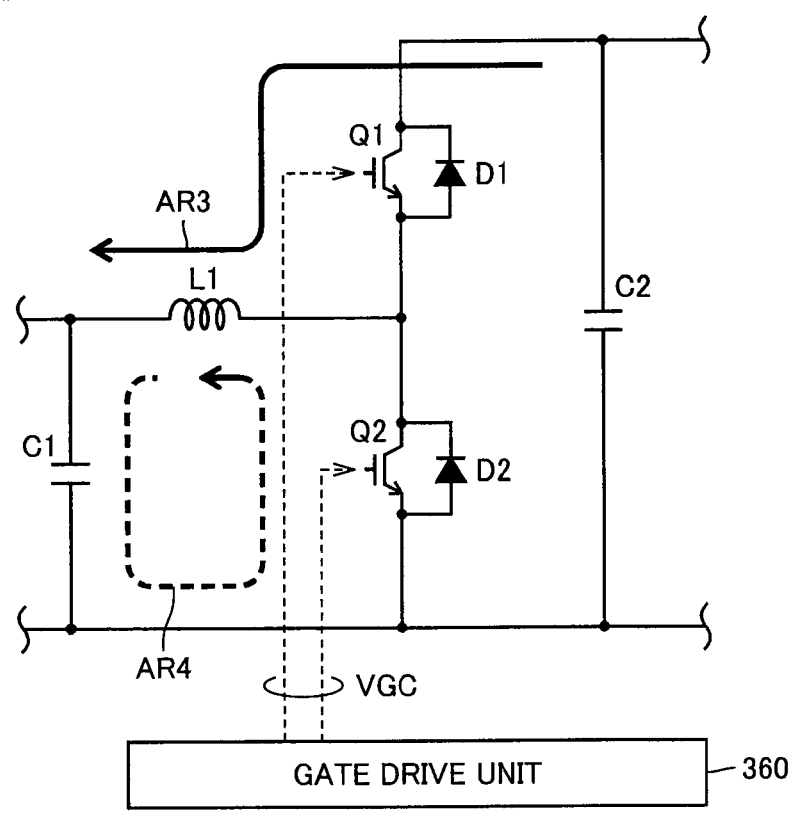
FIG. 11 is a diagram for describing a current flow when a converter is used to discharge the charges remaining in the capacitor.

FIG. 11 is a diagram for describing the operation for discharging the charges remaining in capacitor C2 using converter 130 in FIG. 1.

Referring to FIGS. 1 and 11, during ordinary running, the DC voltage from power storage device 110 is boosted by converter 130, and thus, the voltage applied to capacitor C2 is generally higher than the voltage applied to capacitor C1.

When a crash occurs, the gate voltage is applied to switching element Q1 to bring switching element Q1 into conduction in order to discharge the charges remaining in capacitor C2, and a current flows from capacitor C2 through switching element Q1 and reactor L1 to capacitor C1 as indicated by an arrow AR3. At this time, energy is stored in reactor L1.

Thereafter, switching element Q1 is brought out of conduction and the gate voltage is applied to switching element Q2. Then, the current follows a circulating path as indicated by a dashed arrow AR4 while the energy stored in reactor L1 is being released to capacitor C1. In the case where switching elements Q1 and Q2 are the reverse conducting-type semiconductor elements, the conduction resistance of diode D2 can be increased and the conduction loss in diode D2 can be increased by increasing the gate voltage applied to switching element Q2 as described in the above example using the inverter.

As described above, in the case of the configuration having the converter including the reverse conducting-type semiconductor element as shown in FIG. 1, the time for discharging the remaining charges can further be shortened by performing the discharging operation with the converter in addition to the above-mentioned discharging operation with the inverter and the motor generator, and increasing the gate voltage applied to the switching element in the circulating path and increasing the conduction loss in the diode in the converter as well.

In addition, the discharging operation with the converter can be performed inside the PCU without using the devices such as the motor generator external to the PCU. Therefore, even when a conduction path such as a cable between the motor generator and the PCU is disconnected due to occurrence of a crash, for example, the remaining charges can be discharged in the PCU alone using the converter. At this time, the discharge time using the converter can be shortened by increasing the gate voltage applied to the switching element in the circulating path and increasing the conduction loss in the diode in the converter.

In order to facilitate understanding, the case where the charges remaining in the capacitor is discharged when a vehicle crash occurs has been described by way of example in the above-mentioned embodiment. However, the above-mentioned control is also applicable when the charges remaining in the capacitor must be discharged in the cases other than the vehicle crash.

It is to be noted that "control unit 370" in the present embodiment corresponds to "control device" in the present invention.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A drive apparatus for driving a rotating electric machine mounted on a vehicle by using electric power from a power storage device, said drive apparatus comprising:
a power conversion device including a switching element and converting the electric power from said power storage device;
a capacitor connected in parallel to said power conversion device; and
a control device for driving a control terminal of said switching element and discharging a charge stored in said capacitor, wherein
said power conversion device includes a plurality of reverse conducting-type semiconductor elements,
each of said plurality of reverse conducting-type semiconductor elements is integrally formed of a first semiconductor element operating as said switching element and a second semiconductor element connected in parallel to said first semiconductor element and operating as a free wheeling diode,
at the time of an operation for discharging said capacitor, said control device changes a voltage applied to said control terminal of said first semiconductor element and increases an electric power loss in said second semiconductor element during a current-circulating operation by said second semiconductor element, and
each of said plurality of reverse conducting-type semiconductor elements has a property that a conduction resistance of said second semiconductor element increases as the voltage applied to said control terminal of said first semiconductor element increases during said current-circulating operation.

2. The drive apparatus according to claim 1, wherein
at the time of discharging said capacitor, said control device sets the voltage applied to said control terminal of said first semiconductor element included in the reverse conducting-type semiconductor element existing in a circulating path during said current-circulating operation, among said plurality of reverse conducting-type semiconductor elements, to be higher than a voltage applied when said rotating electric machine is driven.

3. The drive apparatus according to claim 1, wherein
in each of said plurality of reverse conducting-type semiconductor elements, said first semiconductor element is formed of an IGBT and said second semiconductor element is formed of a diode connected in antiparallel to said IGBT.

4. The drive apparatus according to claim 1, wherein
each of said plurality of reverse conducting-type semiconductor elements is formed of a power MOSFET, and
said second semiconductor element is a parasitic diode of said power MOSFET.

5. The drive apparatus according to claim 1, wherein
said vehicle includes a crash detecting unit for detecting a crash of said vehicle, and
when said crash detecting unit detects the crash of said vehicle, said control device drives said control terminal of said switching element and discharges the charge stored in said capacitor.

6. The drive apparatus according to claim 2, wherein
said power conversion device is an inverter including at least one of said plurality of reverse conducting-type semiconductor elements and driving said rotating electric machine, and
at the time of discharging said capacitor, said control device discharges the charge in said capacitor by using said inverter and said rotating electric machine.

7. The drive apparatus according to claim 2, wherein
said power conversion device is a converter including at least one of said plurality of reverse conducting-type semiconductor elements and a reactor, which constitute a chopper circuit, and converting a DC voltage supplied from said power storage device, and
at the time of discharging said capacitor, said control device controls said converter to discharge the charge in said capacitor using said reactor.

8. The drive apparatus according to claim 6, wherein
said control device discharges the charge in said capacitor by causing a coil included in said rotating electric machine to consume the charge, without rotating said rotating electric machine.

9. A drive apparatus for driving a rotating electric machine mounted on a vehicle by using electric power from a power storage device, said drive apparatus comprising:
an inverter having at least one reverse conducting-type semiconductor element integrally formed of a first semiconductor element operating as a switching element and a second semiconductor element connected in parallel to said first semiconductor element and operating as a free wheeling diode, and driving said rotating electric machine;
a capacitor connected in parallel to said inverter; and
a control device for driving a control terminal of said switching element and discharging a charge stored in said capacitor, wherein
at the time of an operation for discharging said capacitor, said control device changes a voltage applied to said control terminal of said first semiconductor element and increases an electric power loss in said second semiconductor element during a current-circulating operation by said second semiconductor element, and
each of said plurality of reverse conducting-type semiconductor elements has a property that a conduction resistance of said second semiconductor element increases as the voltage applied to said control terminal of said first semiconductor element increases during said current-circulating operation.

10. The drive apparatus according to claim 9, further comprising
a converter having said reverse conducting-type semiconductor element, and converting a DC voltage from said power storage device and supplying converted said DC voltage to said inverter.

11. A vehicle, comprising:
a power storage device;
a rotating electric machine; and
a drive apparatus for driving said rotating electric machine by using electric power from said power storage device, and generating running drive force,
said drive apparatus including:
a power conversion device having a switching element and converting the electric power from said power storage device;
a capacitor connected in parallel to said power conversion device; and
a control device for driving a control terminal of said switching element and discharging a charge stored in said capacitor, wherein
said power conversion device includes a plurality of reverse conducting-type semiconductor elements,
each of said plurality of reverse conducting-type semiconductor elements is integrally formed of a first semiconductor element operating as said switching element and a second semiconductor element connected in parallel to said first semiconductor element and operating as a free wheeling diode,
at the time of an operation for discharging said capacitor, said control device changes a voltage applied to said control terminal of said first semiconductor element and increases an electric power loss in said second semiconductor element during a current-circulating operation by said second semiconductor element, and
each of said plurality of reverse conducting-type semiconductor elements has a property that a conduction resistance of said second semiconductor element increases as the voltage applied to said control terminal of said first semiconductor element increases during said current-circulating operation.

12. A method for controlling a drive apparatus for driving a rotating electric machine mounted on a vehicle by using electric power from a power storage device,
said drive apparatus including:
a power conversion device having a switching element and converting the electric power from said power storage device; and
a capacitor connected in parallel to said power conversion device,
said power conversion device including a plurality of reverse conducting-type semiconductor elements,
each of said plurality of reverse conducting-type semiconductor elements being integrally formed of a first semiconductor element operating as said switching element and a second semiconductor element connected in parallel to said first semiconductor element and operating as a free wheeling diode,
said method comprising the steps of:
driving a control terminal of said switching element and discharging a charge stored in said capacitor; and
at the time of discharging the charge in said capacitor, changing a voltage applied to said control terminal of said first semiconductor element and increasing an electric power loss in said second semiconductor element during a current-circulating operation by said second semiconductor element, wherein
each of said plurality of reverse conducting-type semiconductor elements has a property that a conduction resistance of said second semiconductor element increases as the voltage applied to said control terminal of said first semiconductor element increases during said current-circulating operation.

* * * * *

UNITED STATES PATENT AND TRADEMARK OFFICE
CERTIFICATE OF CORRECTION

| | | |
|---|---|---|
| PATENT NO. | : 8,878,476 B2 | Page 1 of 1 |
| APPLICATION NO. | : 13/549127 | |
| DATED | : November 4, 2014 | |
| INVENTOR(S) | : Satoshi Hirose | |

It is certified that error appears in the above-identified patent and that said Letters Patent is hereby corrected as shown below:

On the Title Page, Item (54), and in the Specification, column 1, line 2, in the title, change "CAPACITOR IN APPARATUS" to -- CAPACITOR IN DRIVE APPARATUS --.

Signed and Sealed this
Twenty-ninth Day of September, 2015

Michelle K. Lee
*Director of the United States Patent and Trademark Office*